United States Patent [19]

Alder

[11] Patent Number: 4,476,894
[45] Date of Patent: Oct. 16, 1984

[54] VALVE WITH CIRCULATION TIMER

[75] Inventor: Robert L. Alder, Irvine, Calif.

[73] Assignee: Smith International, Inc., Newport Beach, Calif.

[21] Appl. No.: 391,412

[22] Filed: Jun. 23, 1982

[51] Int. Cl.³ .............................................. F16K 37/00
[52] U.S. Cl. .................................... 137/552.7; 175/40
[58] Field of Search ............... 137/552.7; 175/40, 107, 175/324

[56] References Cited

U.S. PATENT DOCUMENTS 3,005,507 10/1961 Clark, Jr. et al. .................... 175/324
3,989,114 11/1976 Tschirky et al. ..................... 175/107
4,298,077 11/1981 Emery ................................. 175/107
4,387,774 6/1983 Herbert ................................. 175/40

Primary Examiner—Alan Cohan
Assistant Examiner—John A. Rivell
Attorney, Agent, or Firm—Jackson, Jones & Price

[57] ABSTRACT

A mounting for a valve to record the duration of time during which circulation under pressure passes through the valve in which a timer and a battery circuit for the timer is mounted in the valve in a removable container carrying a magnetic switch for the battery circuit and a trigger mechanism to close the switch when circulation through the valve occurs.

6 Claims, 8 Drawing Figures

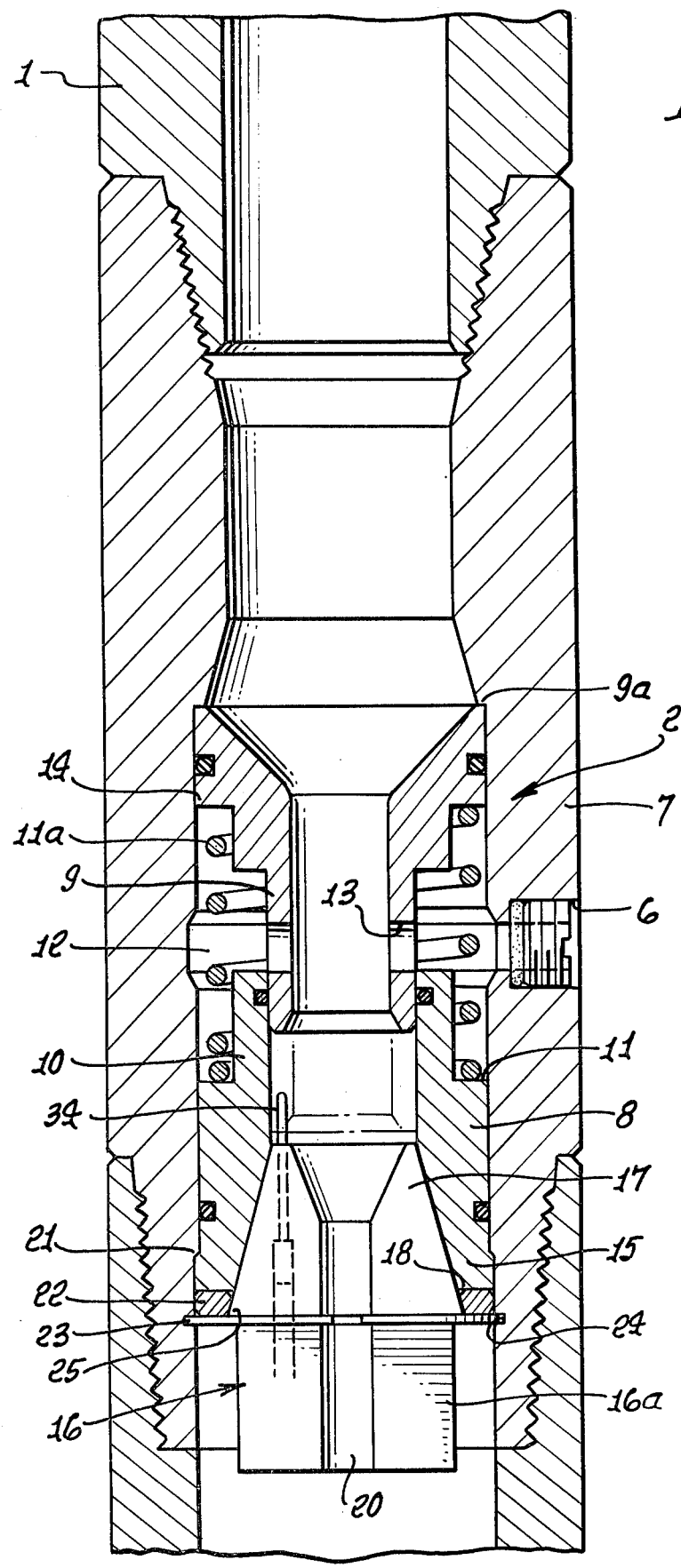

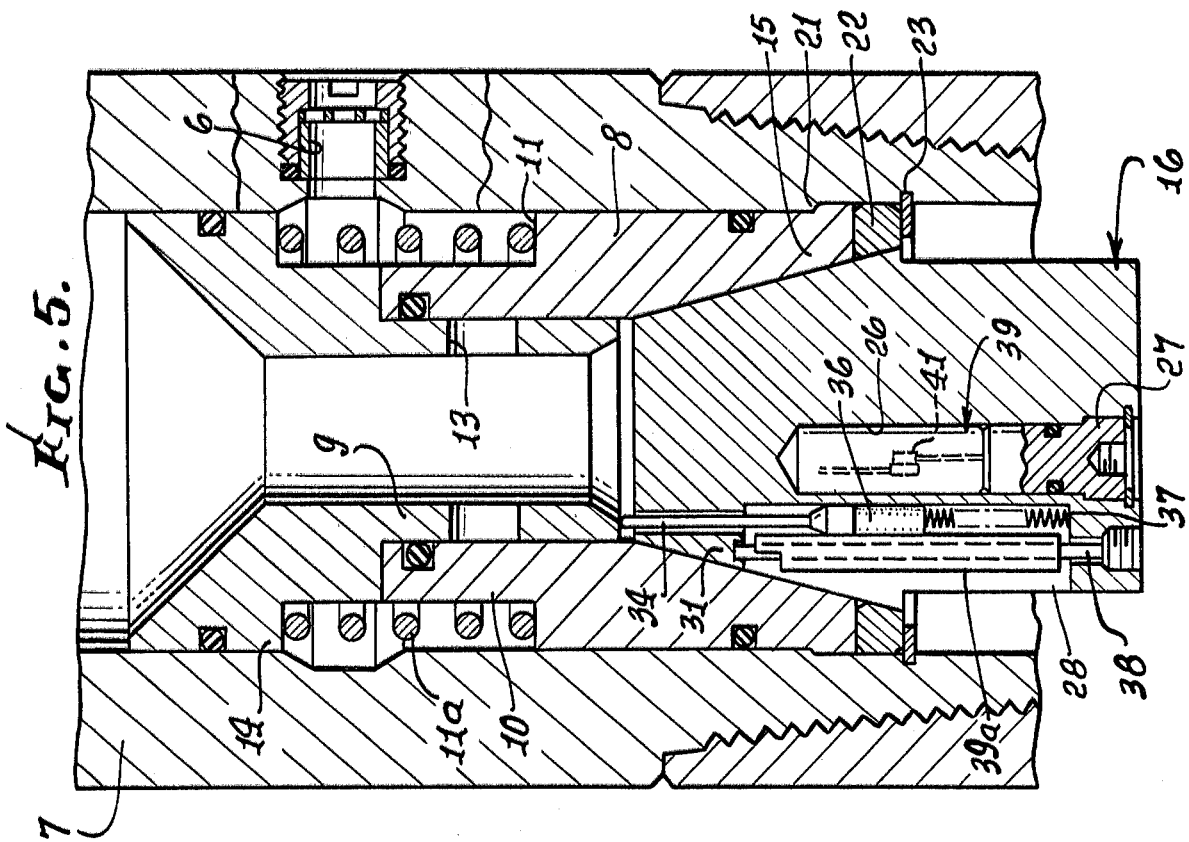
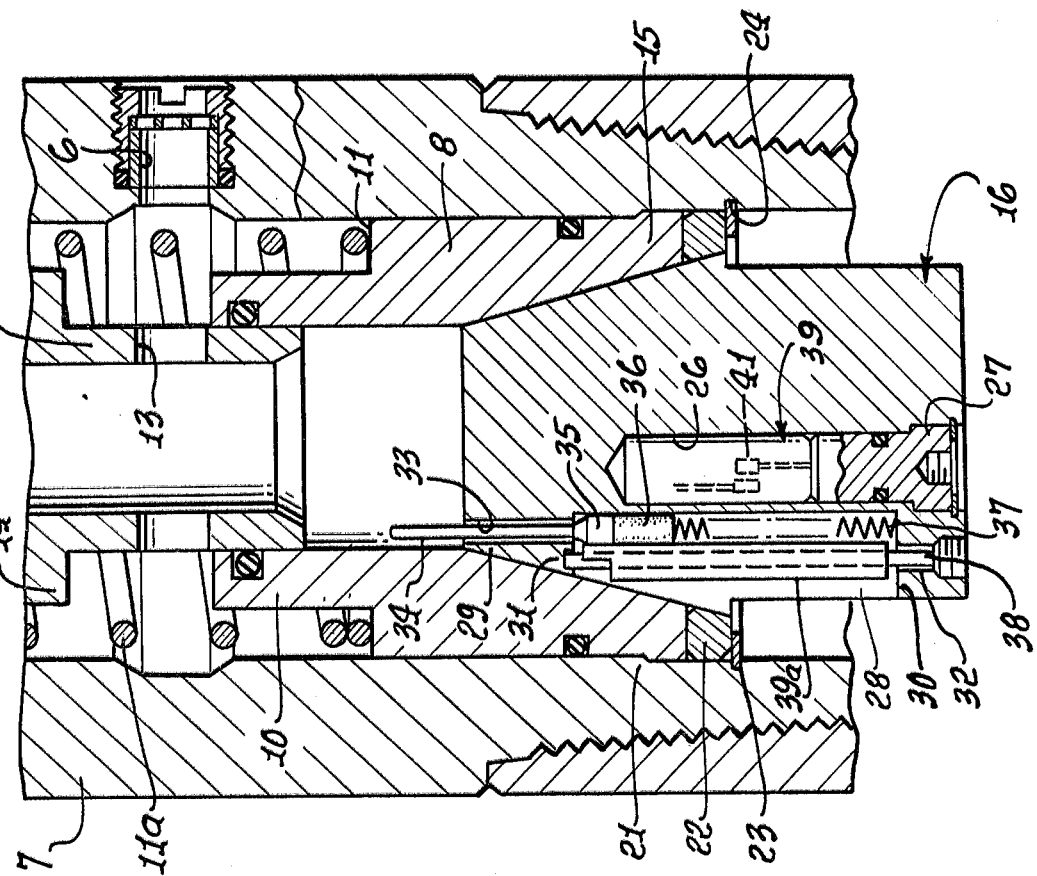

VALVE WITH CIRCULATION TIMER

BACKGROUND OF THE INVENTION

This invention relates to drill string by-pass valves, circulation valves employed in bore-hole drilling for oil and gas. In such valves, a circulation port is provided, whereby when pump circulation of drilling fluid is substantially reduced when the drill bit is "off bottom" or discontinued during "tripping", drilling fluid present in the drill string is discharged from the drill string through a port in the valve into the bore hole annulus. When pump circulation of drilling fluid to the bit is again started, a sleeve in the valve is displaced so as to close the by-pass port and permit circulation through the nozzles which are provided in the drill bit for circulation up the annulus to the surface. See U.S. Pat. No. 3,005,507, which illustrates such a valve known as a dump valve and U.S. Pat. Nos. 3,989,114 and 4,298,077 which illustrate a by-pass valve when circulation under pump pressure continues. Such valves are termed dump valves when they are used to insure discharge of fluid above the bit when no circulation is induced by the pump as in "running in", that is, assembling the drill string or disassembling the drill string, by a procedure known as "tripping". Such by-pass valves are termed "circulation valves" when they function when drilling is discontinued and the drill string is lifted off bottom and circulation is caused to discharge through the by-pass valve under reduced pressure.

While such by-pass valves are used in ordinary rotary drilling, where the entire drill string is rotated, they are also used when the drill is rotated by an in-hole motor mounted at the end of the drill string adjacent the bit particularly motors rotated by the circulation of the drilling fluid passing through the valve to the bit.

The by-pass valves are particularly useful in connection with the positive displacement motors such as described in U.S. Pat. Nos. 4,298,077, 4,220,380 or 3,989,114.

STATEMENT OF THE INVENTION

This invention is an improvement of of the by-pass valves of the prior art by providing a timing device positioned in the by-pass valve to record the period of time during which the valve is in position to circulate fluid and therefore the time during which drilling fluid is pumped through the drill string to the bit and consequently circulated to the surface.

A timer such as is described in copending application, Ser. No. 260,269, filed May 4, 1981, now U.S. Pat. No. 4,387,274 assigned to the assignee of this application, is mounted in a sleeve of the valve so as to be activated to start recording the passage of time during which circulation is conducted down the drill string up the annulus to the surface.

In my presently preferred embodiment of the best mode of my invention, a magnetic switch is provided which closes a circuit on a time recorder mounted in the sleeve of the valve. When pump circulation is started sufficiently to close the by-pass port of the valve, the magnetic circuit is altered by displacement of an actuating magnet. When the pump pressure is materially reduced, or the circulation through the drill string is discontinued and drilling fluid by-pass discharge opening is open, the actuating magnet is withdrawn, thus permitting the switch to open and interrupt the recording of time by the time recorder. The time recorder of my invention when assembled with a by-pass valve to form the by-pass valve of my invention, is mounted in an adaptor unit, which may be assembled with a sleeve of the by-pass valve. The timer of my invention includes a trigger which is actuated to activate the timer when the sleeve of the by-pass valve is displaced to close the by-pass port and deactivate the timer when the sleeve is displaced to open the by-pass port.

In my presently preferred embodiment of my invention, I mount the timer recorder and the magnetic switch in a compartment formed in a removable insert container. I also provide a trigger mechanism, including a spring biased magnet mounted so that when the sleeve of the valve is displaced to close the discharge port in the valve, the magnet is moved to register with the magnetic switch so as to close the magnetic switch. When circulation is discontinued and the sleeve moves to open the by-pass discharge port, the magnet is displaced so as to move it away from the magnetic switch and thus open the circuit of the timer.

The by-pass valve of my invention may be used as prior art dump valves or circulation valves adjacent the bit in the case of ordinary rotary drilling, such as illustrated in the Clark U.S. Pat. No. 3,005,507.

While my invention may be used in drill string in rotary drilling in which the entire drill string is rotated, it has particular adaptability for use with the forms of inhole drill motors described in the above enumerated patents or in fluid turbine driven drills, known as "turbodrills". In such positive displacement advancing cavity motors as described in said patents, when circulation is discontinued by reduction in pump pressure, the motor is an effective seal against circulation through the bit.

The by-pass valve permits the fluid in the drill string to discharge through the discharge port of the valve as for example, when pumping is discontinued, as during tripping, or when circulating off bottom, where the dump valve is combined with a circulating valve, as in the U.S. Pat. No. 4,298,077. In such situations, the by-pass valve of my invention will record that no circulation was being passed to the drill bit.

Where the by-pass valve of my invention is employed with fluid operated in-hole drilling motors, the time recorder has the additional advantage of recording the period of time during which the drilling motor is fluid operated.

The following describes the preferred embodiment of my invention and the best mode contemplated for use of my invention, in which the timer mounting of my invention is mounted in a by-pass valve, known as a dump valve in which when circulation ceases, fluid present in the drill string may discharge through the by-pass port.

FIG. 3 is a section of FIG. 2, taken on line 3—3 of FIG. 2.

FIG. 4 is a section of FIG. 2, taken on line 4—4 of FIG. 2 showing the position of the discharge ports in open position.

FIG. 5 is a section similar to FIG. 4, but showing the discharge port in closed position.

Figure 1:
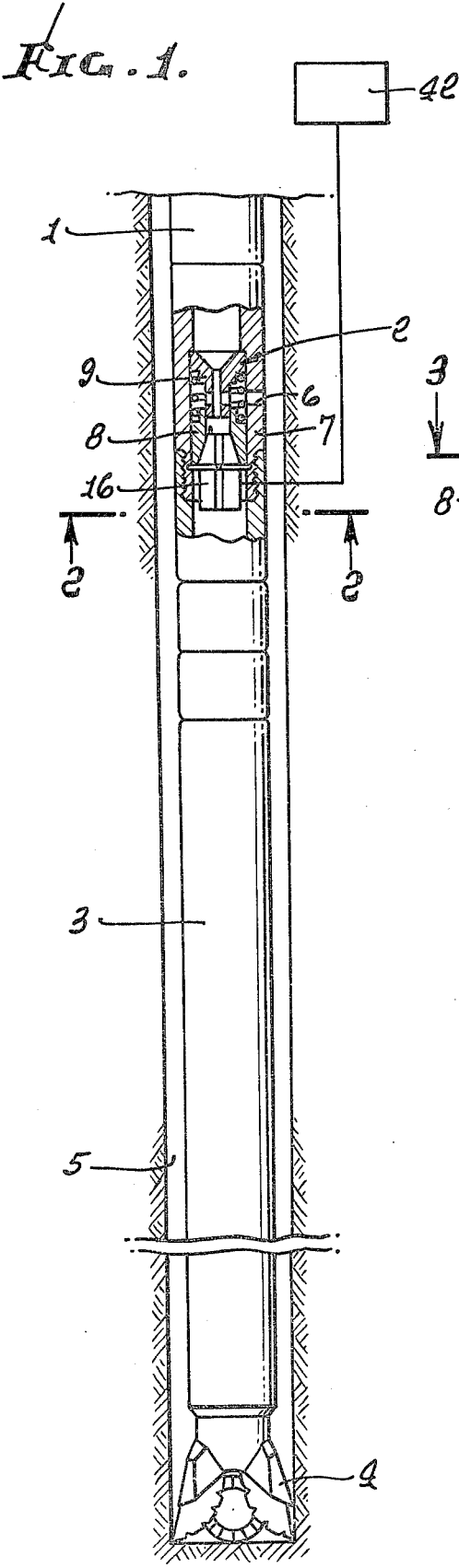
FIG. 1 is a schematic illustration of the combination of the by-pass valve of my invention in the form of a dump valve.

FIG. 1 illustrates a conventional drill string 1 containing a dump valve 2 and a bit 4. If an in-hole fluid motor is used it is positioned at 3 as is illustrated in the patents cited above. The fluid when it is circulated through the bit 4 is discharged into the annulus 5 to be circulated to the surface.

When drilling is discontinued, the drilling fluid is discharged through the port 6 in the housing 7 of the dump valve. Slidably mounted in the housing 6 is a piston sleeve 9 telescoped into the fixed sleeve 8. The sleeve 8 has an extension 10 of external diameter providing a flange surface 11. Encompassing the sleeve 9 and the extension 10 is a spring 11a biasing the piston sleeve 9 to an upward position. Communication is established between port 6 and space 12 containing the spring 11a and port 13 in the piston sleeve 9.

The piston sleeve 9 at its entrance end 14 is conical. Suitable O ring seals are provided between the exterior wall of the piston sleeve 9 and housing 7.

Figure 2:
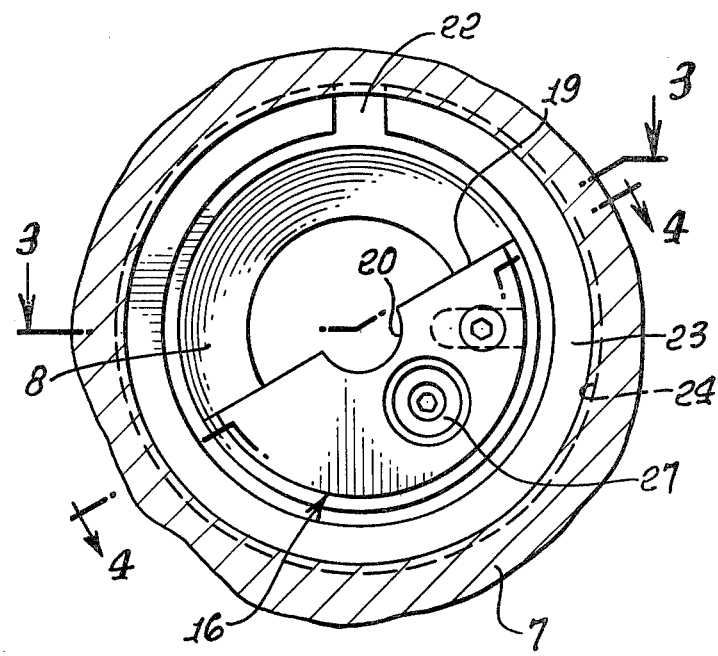
FIG. 2 is a section through the dump valve taken on line 2—2 of FIG. 1.

Seated on the conical end 15 of the sleeve 8 is the timer container 16, having a semi-cylindrical section 16a and a semi-conical section 17 with an external end 18. The plannar face 19 of the container 16 (see FIG. 2) is notched with a semi-cylindrical notch 20.

The sleeve 8 is seated in the housing 7 on the interference fit 21 and the split ring 22 is seated on the end 18 and secured by the snap ring 23, fitting into groove 24 in housing 7 and seated on shoulder 25 of the container 16.

The container 16 (see FIGS. 4 and 5) is bored to form a chamber 26 closed by a plug screw 27. It contains the timer and switch described below.

The container is grooved externally at 28 and bored at 29 parallel to the chamber 26. The groove 28 terminates in a head 30 and a bottom 31. The head is bored at 32 and the bottom is bored at 33.

Positioned in the bore 33 and extending into the groove 28 and from the bottom 31 is a trigger rod 34. Positioned on the end 35 of the trigger rod 34 is a permanent magnet 36 held against the end 35 by the spring 37 positioned in the groove 28 between the head 30 and the magnet 36. Mounted in bore 32 and positioned on bottom 31 is a rod 38 holding a cover 39a.

The timer, mounted in the chamber 26, is described in said application Ser. No. 260,269, assigned to the assignee of this application. The said description is incorporated herein by this reference.

The timer as described in said application is improved in the timer of this application by the introduction of the magnetic switch as described herein.

Mounted in chamber 26 is a clock mechanism 39 (see FIG. 6) operated by battery power 40 whose circuit is closed by a switch 41. Switch 41 is a well known article of commerce and is composed of flexible magnetized arms which are separated until magnetized by an external magnet. It is used in the dump valve described herein to close the circuit of the timer. When the switch is closed, the timer 42 starts recording the period of time during which the circuit remains closed.

Figure 7:
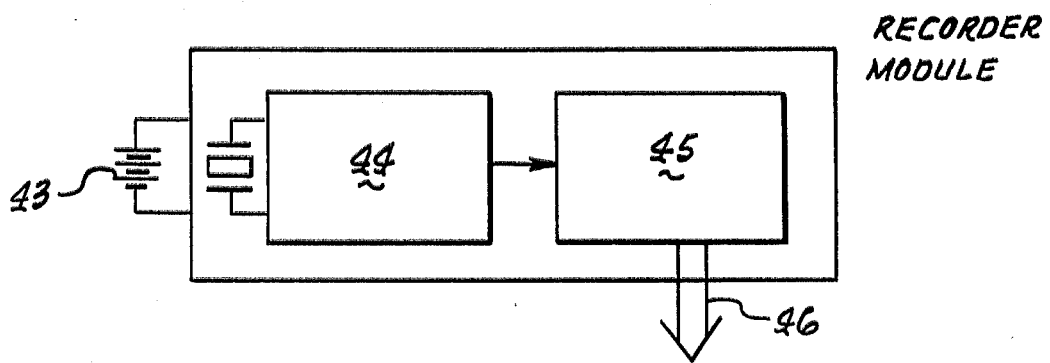
FIG. 7 is a block diagram of another form of timer.
Figure 8:
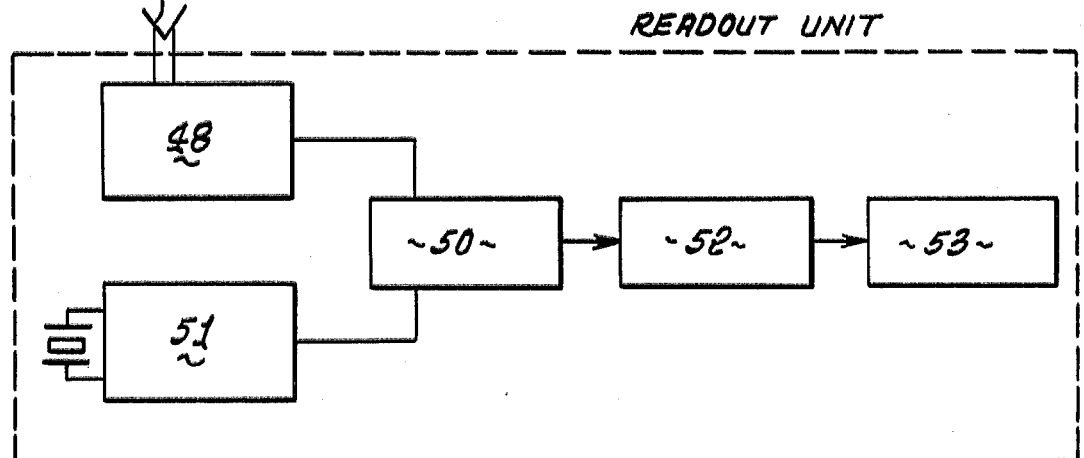
FIG. 8 is a block diagram of a form of read out unit suitable for use with the timer of FIG. 7.

FIGS. 7 and 8 illustrate the presently preferred embodiment of the timer used in my invention.

The schematic diagram, FIGS. 7 and 8, illustrate such recorders. FIG. 7 illustrates the recorder in my preferred embodiment whereby the time during which the switch contacts are closed is recorded. FIG. 8 is a schematic diagram of the decoding and read out circuit suitable for use to read and display the time recorded by the recording unit, such as is shown in FIG. 7.

The various circuit elements are of conventional design and are widely used for the circuit functions for which they are used in my invention.

The circuit elements represented by the block diagram are all conventional and are available as commercial articles as is well known to those skilled in the relevant art.

Figure 6:
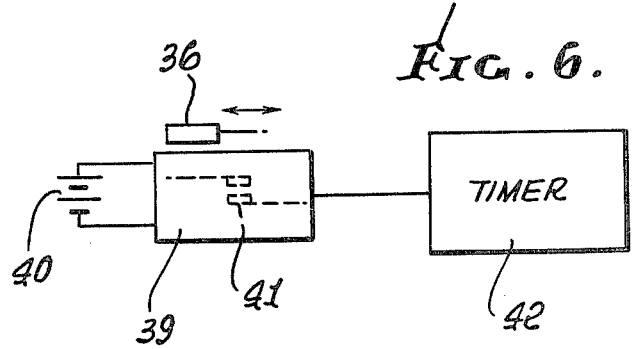
FIG. 6 is a block diagram of one form of timer.

In FIG. 6, the battery 40 is connected to the digital clock 42 through the switch 41. The digital clock 42 displays the real time interval during which the switch closes the battery circuit on the clock.

Such clocks are commonly available.

FIG. 7 illustrates the time recorder which is my presently preferred embodiment. Battery 43 is the battery positioned in chamber 26 whose circuit is closed by the magnetic switch. It powers the crystal controlled oscillator 44 which delivers a square wave high frequency pulse. The signal is delivered to the counter 45. The counter counts the pulses delivered to the counter in the period of real time during which the switch is closed. This signal is applied to the output 46 of the counter.

A decoder is provided at the surface to read the signal output at 46 and to translate the signal to the real time interval.

In FIG. 8 the terminal 47 is the input connection to the decoder, whereby the signal delivered at 46 may be applied to the buffered pick-up 48 and to the comparator 50. The oscillator 51 delivers square wave at the desired frequency and is applied to the comparator 50. The output of the comparator is converted in decoder 52 into a digital signal of the real time interval, for example, which may be displayed at 53, as hours and minutes which is the real time interval corresponding to the digital signal delivered to the buffered pick-up 48.

When assembled at the surface the dump valve parts are separated as shown in FIGS. 3 and 4.

On assembly, the piston sleeve 9 is seated on ledge 9a and the fixed sleeve 8 is held against the split ring 22 and snap ring 23 by the spring 11. In this position, the ports 13 are in registry with the ports 6 in housing 7. The trigger rod 34 is displaced from the lower end of the piston sleeve 9. In this condition, the magnet 36 is displaced from the spring arms of the switch 41 so that the circuit of battery 40 to the time recorder is open.

When the drill string is assembled, or disassembled, during tripping, the dump valve permits fluid in or entering into the drill string, to pass through the ports 6 and 13 without causing a displacement of the piston sleeve and therefore the timer remains inactive.

When circulation begins again from the surface, the pump pressure exerted against the end 14 of the piston sleeve displaces the sleeve by telescoping it into the end 10 of the sleeve 8, thus forcing the rod 33 and the magnet 36 downward to bring the magnet into position to actuate the magnetic switch 41 to close the battery circuit.

The circuit is thus closed on the timer which records the period of time during which circulation passes through the dump valve sufficiently to close the dump valve by-pass ports 6.

At such time as the drill string is disassembled, as in tripping, the timer may be removed from the chamber 26 and the period of time during which such circulation has occurred may be read.

The measure of time during which circulation passes through the dump valve to the bit is of importance in determining the bit efficiency, as measured by the state of the bit recovered by tripping, as measured by the period of time during which drilling occurs as evidenced by the record made by the timer. It is of importance in the case that the bit is rotated by a down-hole motor where rotation is caused by the circulation through the dump valve to and through the motor to determine the effect of drilling time on the state of the bearings and the stator.

I claim:

1. A valve comprising a housing, a port in said housing, a piston sleeve movably mounted in said housing, a port in said piston sleeve, a second sleeve in said housing telescopically mounted in said housing with respect to said piston sleeve, a magnetic switch positioned in said second sleeve, a battery operated timer positioned in said second sleeve, said magnetic swtich operatively connected between said battery and said timer, means to open or close said switch on displacement of said piston sleeve on circulation of fluid through said sleeve, whereby said port in said piston sleeve is displaced from said port in said housing.

2. In the valve of claim 1, said switch, battery and timer positioned in a separate container removably mounted in said second sleeve.

3. In the valve of claim 1, a removable container mounted in said second sleeve, a chamber in said container, said battery switch and timer mounted in said chamber, a rod movably mounted in said container extending from said container, a magnet mounted on said rod, whereby on displacement of said piston sleeve against the extended end of said rod the magnet is moved towards the magnetic switch to close said switch.

4. A valve comprising a housing, a port in said housing, a piston sleeve movably mounted in said housing, a port in said piston sleeve, a spring biasing said piston sleeve to hold said last named port in registry with the port in said housing, a second sleeve mounted in said housing, a timer mounted in said second sleeve; said timer comprising a semi-circular section, a chamber bored in said semi-circular section, a plug for said bore, a groove in the exterior of said section, a battery, a magnetic switch and a time responsive device in said chamber, a trigger rod in said groove extending from the end of said container, a magnet in said groove mounted on said trigger rod.

5. A valve comprising a housing, a port in said housing, a piston sleeve movably mounted in said housing, a port in said piston sleeve, a second sleeve in said housing, a timer mounted in said second sleeve, said timer comprising a semi-circular housing section, a chamber bored in said semi-circular section, a plug for said bore, a groove in the exterior of said section, a battery, a magnetic switch and a time responsive device in said chamber, a trigger rod in said groove extending from the end of said container, a magnet in said groove mounted on said trigger rod.

6. The valve of claim 5, the said chamber removably mounted in said second sleeve.

* * * * *